United States Patent
Doney et al.

(10) Patent No.: US 11,410,235 B2
(45) Date of Patent: Aug. 9, 2022

(54) METHOD, APPARATUS, AND COMPUTER-READABLE MEDIUM FOR COMPLIANCE AWARE TOKENIZATION AND CONTROL OF ASSET VALUE

(71) Applicant: Securrency, Inc., Arlington, VA (US)

(72) Inventors: George Daniel Doney, Riva, MD (US); Ihor Yermakov, oDESA (UA)

(73) Assignee: Securrency, Inc., Arlington, VA (US)

( * ) Notice: Subject to any disclaimer, the term of this patent is extended or adjusted under 35 U.S.C. 154(b) by 149 days.

(21) Appl. No.: 16/143,058

(22) Filed: Sep. 26, 2018

(65) Prior Publication Data

US 2019/0164151 A1 May 30, 2019

Related U.S. Application Data

(60) Provisional application No. 62/732,189, filed on Sep. 17, 2018, provisional application No. 62/563,684, filed on Sep. 27, 2017.

(51) Int. Cl.
*G06Q 40/04* (2012.01)
*G06Q 20/36* (2012.01)
(Continued)

(52) U.S. Cl.
CPC ......... *G06Q 40/04* (2013.01); *G06Q 20/3678* (2013.01); *G06Q 20/389* (2013.01);
(Continued)

(58) Field of Classification Search
None
See application file for complete search history.

(56) References Cited

U.S. PATENT DOCUMENTS

| 7,657,474 B1 * | 2/2010 | Dybala | G06Q 40/02 705/37 |
|---|---|---|---|
| 8,112,340 B2 | 2/2012 | Watson et al. | |

(Continued)

FOREIGN PATENT DOCUMENTS

| EP | 3564884 A1 * | 11/2019 | H04L 9/0637 |
|---|---|---|---|
| WO | 2013067576 A2 | 5/2013 | |

(Continued)

OTHER PUBLICATIONS

Extended European Search Report for European Application No. 17744939.4 dated Jun. 4, 2019.

(Continued)

*Primary Examiner* — Jacob C. Coppola
(74) *Attorney, Agent, or Firm* — Rimon PC; Marc Kaufman (57) ABSTRACT

An apparatus, computer-readable medium, and computer-implemented method to facilitate scalable compliance and issuer governance of decentralized financial transactions especially for the trade and transfer of tokenized securities. The resulting Compliance Aware Tokens contain the rulesets to restrict transactions and facilitate regulatory reporting and oversight. The embodied process, includes of a novel combination of compliance workflows, attribute verification tools, smart contracts and other ledger controls, provides a decentralized Attribute Based Access Control (ABAC) capability. ABAC patterns are extended to govern global financial transactions without the need for an active intermediary.

33 Claims, 8 Drawing Sheets

(51) Int. Cl.
  *G06Q 20/38* (2012.01)
  *G06Q 20/40* (2012.01)
  *G06Q 20/12* (2012.01)
  *G06Q 30/00* (2012.01)

(52) U.S. Cl.
  CPC ....... *G06Q 20/3821* (2013.01); *G06Q 30/018* (2013.01); *G06Q 20/1235* (2013.01); *G06Q 20/40* (2013.01); *G06Q 2220/00* (2013.01)

(56) References Cited

U.S. PATENT DOCUMENTS

| | | | |
|---|---|---|---|
| 9,824,031 | B1 | 11/2017 | Ganti et al. |
| 9,836,790 | B2 | 12/2017 | Ronca et al. |
| 9,997,028 | B2 | 6/2018 | Kim et al. |
| 10,013,573 | B2 | 7/2018 | Dillenberger |
| 10,127,552 | B2 | 11/2018 | Ronca et al. |
| 10,140,470 | B2 | 11/2018 | Kurian et al. |
| 10,147,284 | B2 | 12/2018 | Lee et al. |
| 10,158,527 | B2 | 12/2018 | Anderson et al. |
| 10,163,084 | B2 | 12/2018 | Lee et al. |
| 10,169,937 | B1 | 1/2019 | Zwink et al. |
| 10,223,679 | B2 | 3/2019 | Lee et al. |
| 10,255,600 | B2 | 4/2019 | Ronca et al. |
| 10,275,739 | B2 | 4/2019 | Hanis et al. |
| 10,275,772 | B2 | 4/2019 | Ronca et al. |
| 2002/0169774 | A1* | 11/2002 | Greenbaum ........... G06Q 40/04 707/999.009 |
| 2003/0097322 | A1* | 5/2003 | Kramer ................. G06Q 40/00 705/35 |
| 2010/0131426 | A1 | 5/2010 | Kroutik |
| 2011/0040666 | A1 | 2/2011 | Crabtree et al. |
| 2012/0278200 | A1 | 11/2012 | van Coppenolle et al. |
| 2013/0024396 | A1 | 1/2013 | Wilhelm et al. |
| 2013/0204894 | A1 | 8/2013 | Faith et al. |
| 2013/0275338 | A1 | 10/2013 | Hosoda et al. |
| 2014/0222594 | A1 | 8/2014 | Rose et al. |
| 2015/0324787 | A1* | 11/2015 | Schaffner ........... G06Q 20/3825 705/67 |
| 2015/0356523 | A1 | 12/2015 | Madden |
| 2017/0011460 | A1 | 1/2017 | Molinari et al. |
| 2017/0221288 | A1 | 8/2017 | Johnson et al. |
| 2018/0253911 | A1 | 9/2018 | Cardonha et al. |
| 2019/0066206 | A1* | 2/2019 | Marks .................... G06Q 40/06 |
| 2019/0114395 | A1 | 4/2019 | Lenchner et al. |
| 2019/0205881 | A1* | 7/2019 | Borzilleri ............... G06Q 20/36 |
| 2019/0333051 | A1* | 10/2019 | Brogger ................ H04L 9/3239 |
| 2020/0007313 | A1* | 1/2020 | Vouk ..................... H04L 67/104 |
| 2020/0051067 | A1* | 2/2020 | Overholser ........ G06Q 20/3672 |

FOREIGN PATENT DOCUMENTS

| | | | | |
|---|---|---|---|---|
| WO | 2017091530 | A1 | 6/2017 | |
| WO | WO-2019067603 | A1 * | 4/2019 | ......... G06Q 20/3678 |

OTHER PUBLICATIONS

International Search Report and Written Opinion received for PCT Application Serial No. PCT/US18/52938 dated Feb. 22, 2019, 8 pages.

Intellectual Property Office of India, First Examination Report for Indian Application No. 202047016598 dated May 4, 2021.

European Patent Office, Supplementary European Search Report for EU App No. EP 18860292 dated May 27, 2021.

* cited by examiner

FIG. 1

JURISDICTION: US
ACCREDITED INVESTOR: YES
INSTITUTIONAL INVESTOR: NO

[REG D] (COUNTRY JURISDICTION=US)
   AND ((US ACCREDITATION=TRUE {<100}
   OR (US INSTITUTIONAL=TRUE))
OR
[REG S] (COUNTRY JURISDICTION!=US)
AND [READING ROOM DOCUMENT LIST]

METHOD, APPARATUS, AND COMPUTER-READABLE MEDIUM FOR COMPLIANCE AWARE TOKENIZATION AND CONTROL OF ASSET VALUE

RELATED APPLICATION DATA

This application claims priority to U.S. Provisional Application No. 62/563,684 filed on Sep. 27, 2017 and U.S. Provisional Application No. 62/732,189 filed on Sep. 17, 2018, the entire disclosures of which are incorporated herein by reference.

BACKGROUND

Digital currency (sometimes referred to as "digital money", "electronic money" or "electronic currency") is a type of currency available in digital form (in contrast to physical, such as banknotes and coins). Digital currency can either be centralized, where there is a central point of control over the money supply, or decentralized, where the control over the money supply can come from various sources. For example, cryptocurrency is a digital asset designed to work as a medium of exchange that uses cryptography to secure financial transactions, control the creation of additional units, and verify the transfer of assets.

Cryptocurrencies can use decentralized control without the need for central banking systems or other trusted centralized parties. The decentralized control can be accomplished through distributed ledger technology (DLT), such as a blockchain, that serves as a shared financial transaction database. In a blockchain, transactions can be recorded as "blocks" of data stored in a linear chain. Each block in the chain contains transaction data and is cryptographically hashed. The blocks can include a hash of the previous-block in the chain. This makes it computationally difficult, virtually impossible, to change data in one block because it would also require changing all subsequent blocks in the chain. This ensures that all data in the overall blockchain has not been tampered with and remains unchanged.

A consensus mechanism is used to authenticate the transactions and record the blocks. Parties conduct transactions through "wallets" which have a unique address and store the public and private keys which can be used to receive or spend a cryptocurrency. The cryptocurrency itself is not in the wallet. Every piece of cryptocurrency has a private key. Wallets hold the private key(s). With the private key, it is possible to digitally sign a transaction and write it in the public ledger, effectively spending the associated cryptocurrency. The chain is stored on multiple devices in a peer-to-peer network. The data stored in blocks can include automatically executable code known as a "smart contract." Smart contracts are computer protocols that facilitate, verify, or enforce the performance of an agreement.

Cryptocurrencies can be thought of as tokens that have a limited supply and in which ownership is recorded on the ledger. Therefore, Cryptocurrencies can be used to "tokenize", i.e. represent, an underlying security, such as an equity interest in an underlying asset. For example, it is known to tokenize various assets, such as real estate and financial instruments, and trade the tokens. Since 2014, efforts to tokenize asset value on distributed ledger technologies have been gaining attention.

However, many tradeable financial assets, and thus any token representing the same, are considered to be "securities" under the regulatory framework of various countries. For example, the US Securities and Exchange Commission (SEC) promulgates and enforces regulatory restrictions on how securities can be sold, who they can be sold to, records that must be kept, and disclosures that must be made. Various other countries have their own laws and regulations governing the sale of securities creating a complex web of regulatory requirements for the sale of securities. Recently, it has become very common to utilize Initial Coin Offerings (ICO) as a mechanism for funding a business based on the sale of cryptocurrency tokens. Such tokens are often deemed to be "securities" under US law and the law of other jurisdictions and thus are subject to the relevant securities laws.

The broad acceptance of digital currency has been stunted by a lack of concern for, or the inability to comply with, the laws and regulations of various jurisdictions. For example, many ICOs were conducted without concern for regulatory compliance and are now being investigated by the SEC or other agencies. Many parties are trying to restrict sales of tokenized assets to jurisdictions that they believe have a regulatory framework that allows such sales. However, the inherent distributed nature of DLT makes it virtually impossible to restrict the jurisdiction of a token sale. Further, governmental entities with potential jurisdiction of the token include the applicable governmental entities having jurisdiction of the original token issuer, the token seller, the token purchaser, the venue for token exchange, and any locations in which the token passes or is stored. The result is that many parties have avoided the sale of tokenized assets entirely to avoid the expense and complexity of regulatory compliance.

It can be seen that securities offerings, from private placements to public offerings, have a wide range of reporting requirements and distribution limitations. There are also a range of tax implications and transfer restrictions associated with securities transactions. While blockchain solutions provide the promise of liquidity by facilitating frequent transactions between investors, this promise cannot be realized without real time enforcement of regulatory compliance. Fully realizing liquidity in token-based securities transactions will require an extensive, yet flexible, compliance framework.

SUMMARY

Implementations of the invention include a method executed by at least one computing device for governing tokenized financial transactions on a distributed ledger over a computer network, the method comprising: obtaining data indicative of a verified identity of at least one participant on a transaction; receiving participant attribute values for the at least one participant, the participant attributes being mapped to a wallet address indicating a category of investor associated with at least one of the at least one participants and a jurisdiction applicable to the at least one participant as well as other participant attributes relevant to assessing the compliance of the transaction; receiving a request to engage in transaction of a token from a requesting participant that is one of the at least one participants, the token having token attribute values describing an underlying asset, the request including an indication of the token, and the participant attributes of the requesting participant; identifying a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieving rights associated with the requested transaction based on the rule, the participant attribute value and the token attribute value, the rights specifying a verb/object pair; determining if the rights permit the requesting participant to engage in the transaction; allowing the transaction when the rights permit the transaction; and recording information indicating the transaction on a distributed ledger.

Another implementation is a system for governing tokenized financial transactions on a distributed ledger over a computer network, the system comprising at least one computer processor and at least one memory having instructions stored therein which, when executed by the at least one computer processor, cause the at least one computer processor to: obtain data indicative of a verified identity of at least one participant on a transaction; receive participant attribute values for the at least one participant, the participant attributes being mapped to a wallet address indicating, among other things, a category of investor associated with at least one of the at least one participants and a jurisdiction applicable to the at least one participant; receive a request to engage in transaction of a token from a requesting participant that is one of the at least one participants, the token having token attribute values describing an underlying asset, the request including an indication of the token, and the participant attributes of the requesting participant; identify a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieve rights associated with the requested transaction based on the rule, the participant attribute value and the token attribute value, the rights specifying a verb/object pair; determine if the rights permit the requesting participant to engage in the transaction; allow the transaction when the rights permit the transaction; and record information indicating the right to perform a transaction on a distributed ledger.

Another implementation is a non-transient computer readable medium storing instructions therein which, when executed by at least one computer processor, cause the at least one computer processor to: obtain data indicative of a verified identity of at least one participant on a transaction; receive participant attribute values for the at least one participant, the participant attributes being mapped to a wallet address indicating, among other things, a category of investor associated with at least one of the at least one participants and a jurisdiction applicable to the at least one participant; receive a request to engage in transaction of a token from a requesting participant that is one of the at least one participants, the token having token attribute values describing an underlying asset, the request including an indication of the token, and the participant attributes of the requesting participant; identify a policy to be enforced for the transaction and at least one rule associated with the policy, the at least one rule including a participant attribute, a comparison operator, and a desired value of the participant attribute and the at least one rule including a token attribute, a comparison operator, and a desired value of the token attribute; retrieve rights associated with the requested transaction based on the rule, the participant attribute value and the token attribute value, the rights specifying a verb/object pair; determine if the rights permit the requesting participant to engage in the transaction; allow the transaction when the rights permit the transaction; and record information indicating the right to perform a transaction on a distributed ledger.

DETAILED DESCRIPTION

There is a need for global scale compliance via a self-enforcing, self-reporting financial services infrastructure that is compliant with the real-time distributed nature of cryptocurrencies. Applicant has discovered that the transparency, immutability, and decentralization of execution logic offered by distributed ledgers can be leveraged to provide the basis for such an infrastructure. These advances provide the means to reduce the cost and latency of complex securities transactions. Through proper implementation of blockchain ledger-based policy enforcement, there exists an opportunity to revolutionize banking and other financial services for the first time since the Medici ledger innovations of the $15^{th}$ century which provided the liquidity that fueled the Renaissance.

Applicant has developed an architecture and protocol that allows known practices in Digital Rights Management (DRM) and Attribute Based Access Control (ABAC) to be leveraged and extended through blockchain smart contracts and compliance workflows to create tokens that incorporate regulatory and other governance requirements implicitly. Implementations disclosed herein facilitate the efficient, compliant transfer of any form of value globally.

As noted above, laws governing the behavior of securities vary from jurisdiction to jurisdiction. A central benefit of distributed ledger technologies is the efficient transfer of value globally. Maximizing this benefit in a securities context requires a compliance framework to control token distribution by identifying and qualifying participants globally, codifying widely varying securities laws from global jurisdictions, and enforcing these rules in all contexts and for any transaction. Technical mechanisms to govern token transactions are referred to herein as "distribution controls." Throughout a security's existence, its transactions incur regulatory oversight. These transactions often have tax implications, require restrictions to protect and qualify investors, demand analysis and reporting to mitigate fraud, and impose requirements designed to restrict money laundering. Since tokenized value can be transferred or traded via decentralized wallets, distribution controls should "travel with" the token and be built into DLTs via smart contracts or other ledger controls. In IT parlance, the distribution controls should be "persistent."

When token ownership is represented on the token's native ledger, token ownership is said to be "on ledger". In many cases, the ownership of token value may be derived from the native ledger value and represented in a different ledger (often an internal database) for efficient handling and custody. Many exchanges and custody solutions use this technique for speed, efficiency, and security. In these cases, the transfers of ownership of the token's value is said to be "off ledger". Since many or all of the same distribution restrictions apply "off ledger", distribution controls should also function in these scenarios and should not be limited exclusively to "on ledger" uses.

To mitigate risk of any systemic weakness of a particular DLT and to ensure securities tokens can leverage innovation in DLTs, distribution controls should be independent of any specific distributed ledger and should be portable across ledger implementations. For example, the disposition of a U.S. real property interest by a foreign person (the transferor) is subject to the Foreign Investment in Real Property Tax Act of 1980 (FIRPTA) income tax withholding; FIRPTA authorized the United States to tax foreign persons on dispositions of U.S. real property interests. Additionally, in some jurisdictions, including the federal laws of the United States, the number of holders of a class of securities is significant. For example, under Section 12(g) of the Securities Act of 1934), if a class of equity securities is held by more than 2000 holders, the issuer of the security becomes obligated to extensive reporting obligations; colloquially, this is known as being a "public company". In the absence of adequate distribution controls, these situations could inadvertently arise resulting in undesirable consequences for the issuer.

Many securities transactions are legally permissible under federal, state or non-U.S. laws or regulations only if the participants meet certain criteria, such as being an "accredited investor", "qualified investor", or the like, or meet certain geographic or residency criteria. In many cases, such as the accreditation status of an investor, these qualities are dynamic rather than static. Since the validity of a transaction depends on changing conditions, the rules enforcement model must be both real time and scalable.

Blockchain networks can be global by design and facilitate the rapid transfer of ownership anywhere in the world. But, as noted above, securities laws can vary dramatically from jurisdiction to jurisdiction. For example, investor qualification, reporting requirements, and even the legality of security token offerings as a capital formation method vary across international jurisdictions. Therefore, securities tokenization requires a compliance framework that can: recognize the jurisdiction of the offering and all participants involved in a transaction; account for complex, even conflicting regulatory requirements in both primary markets and subsequent trade and transfer; incorporate patchwork regulations into rulesets that can be enforced automatically and at scale; and adapt to changes in regulatory restrictions throughout the token's lifecycle.

For many securities, additional restrictions on transactions (beyond regulatory limits) may be required. Restrictions defined by the issuer are common in contracts and practice. Examples include the ability to require explicit issuer permission for transfer, controls on the minimum or maximum size of holdings for participants, bounds on trading price, and more. Restrictions may depend on context such as market conditions, number of participants, participant role within the company, proximity to corporate announcements or actions, etc. The complexity of these rules requires a flexible yet extensive rights management model.

To protect investors, limit fraud, and enable proper government oversight, securities tokens must be handled in a manner consistent with regulations, must be held only by authorized persons, and must comply with proper reporting requirements. The distribution control of implementations herein can be applied to or tokenized securities as well as to the transfer of other tokenized assets. Many governmental authorities require the reporting of large financial transactions. For example, in the United States, the Bank Secrecy Act currently requires financial institutions to report cash transactions exceeding a daily aggregate amount of $10,000 (US) in value or which are suspicious. In order to comply with such regulations, service providers must ensure they know the identity of both sender and receiver of value. Implementations include a computer architecture, platform, and process to govern the compliance and suitability of decentralized financial transactions especially for tokenized securities. While securities transactions are among the most complex financial transactions, the implementations may be applied to govern other transactions such as utility token transfers and fiat payments.

The implementations described herein include a rules engine that maps complex securities laws and transaction controls into verifiable rulesets that can be evaluated in a centralized or decentralized fashion. These rulesets can be saved as "recipes", reusable data structures of a compliance or other governance decision-making, that can be easily shared, edited graphically, and stored on non-transient media in an open standard format such as eXtensible Access Control Markup Language or other computer interpretable code.

The implementations transform illiquid financial instruments, for which transfer is impractical due to the complexity and lack of repeatability in compliance decisions, into highly liquid instruments that can be used in everyday transactions of any size. While the revolution in DLTs are likely to transform the nature of many transactions, many transactions will continue to occur "off chain" in systems and venues that use other techniques such as conventional databases, spreadsheets, or other electronic means to maintain a record of transactions. To account for this, the implementations employ techniques to govern transactions on chain (governing transactions within a DLT), across chains (providing controls on different DLTs), and off chain (governing transactions that occur in traditional ledgers or between ledgers).

Implementations include a novel combination of compliance workflows, attribute verification tools, a scalable key/lock model for enforcement, smart contracts and other ledger controls to provide a decentralized Attribute Based Access Control (ABAC) framework to govern global financial tokenized transactions without the need for an active intermediary. Through ABAC, abstractions of smart contracts, and the sharing of recipes, implementations provide methods to govern on chain and off chain transactions.

In a traditional ABAC model, users' access to objects, such as documents and data, in an enterprise is governed by a policy enforcement point (PEP). The user makes an electronic request for access to an object. The PEP consults with a policy decision service (PDS) which in turn gathers the appropriate policy and attribute data to provide a decision on access. If granted, the user is provided access to the object.

Figure 1:
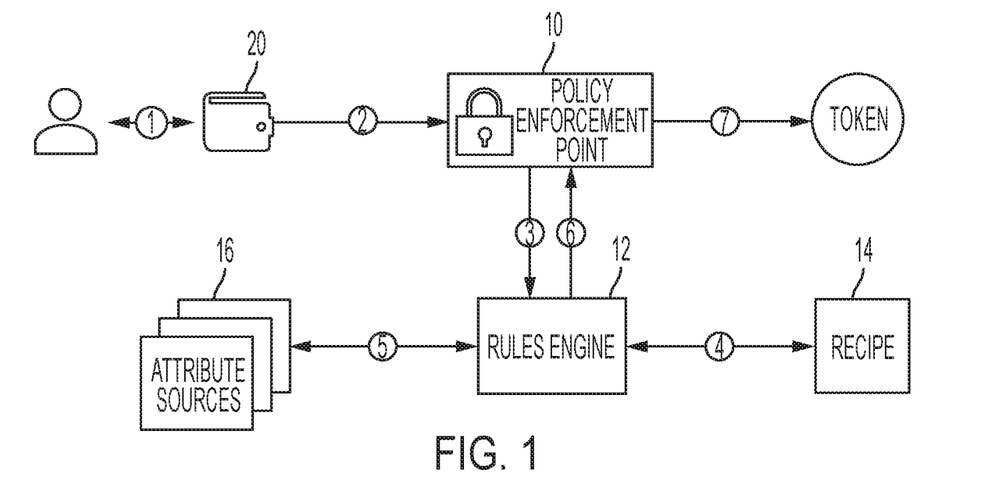
FIG. 1 is a schematic illustration of an architecture and workflow according to an implementation that extends Attribute Based Access Control (ABAC) processes for object management.

FIG. 1 illustrates compliance enhanced architecture 100 that leverages ABAC components and which includes: policy enforcement point (PEP) 10, used to govern transactions of value assets between users, sometimes referred to as "participants", in an enterprise or other domain; rules engine 12 (which includes a policy decision service (PDS)) used to gather the applicable policy and data required to make a decision on access rights; recipe storage 14 (including a policy store) that define the rules required to perform enterprise actions; and attribute sources 16 that provide contextual data related to the users (i.e. the transaction participants), affected tokens (as digital objects), and environment to support a policy decision.

In the implementation of FIG. 1, the ABAC architecture has been enhanced by: 1) establishing a linkage between a user's identity and a unique address (represented by wallet 20) on the network(s) (e.g., a distributed ledger) to provide scalable and deterministic decision-making while protecting the user's privacy; 2) extending the concept of governance of access (a single verb) to "token rights" which include verb/object pairs; 3) sharable recipes of rules and context attributes; 4) implementing policy enforcement via ledger controls and smart contracts; and 6) mapping policies to value tokens.

The implementation includes a novel process of governing decentralized financial transactions including several steps (identified by the bold arrows in FIG. 1). At step 1) the digital identity of all participants in a financial transaction is positively identified. The implementation utilizes a scalable Identity Proofing (IdP) model that operates at global scale. Access to this identity (and its affiliated rights) can be controlled by distributed identity services that provides secure risk-based authentication using multiple factors including biometrics. This service provides flexible, high assurance access to a user's rights on financial networks. Participants are associated with wallet addresses. Reverification of the identity and relevant attributes of the owner of a cryptographic wallet can be performed frequently and at any time to prevent identity theft and/or fraudulent sharing of rights to subvert securities laws. Relevant attributes about the participating identities are verified for all participants in governed transactions. This verification involves risk decisions governed by compliance policies of the party responsible governing token transactions (usually the issuer and/or broker-dealer). While some aspects of verification steps may be automated using techniques the applicant has implemented, some decisions are judgement calls that require longer running workflows or processes.

Once participant ID has been verified, participant attributes may be determined in a known manner, such as through known "know your customer" (KYC) processes, and used in decentralized policy enforcement. By separating attribute verification processes (often slow and subjective) from policy enforcement (nearly instant and objective), compliance enforcement can be performed in real time globally on decentralized networks. In implementations, verified attributes are linked to unique addresses, e.g. cryptographic wallets, on the network. On distributed ledgers, each wallet corresponds to an address. Authority to operate the wallet can be assessed using rights derived from the wallet owner's attributes (via the PEP as described below). In implementations, user attribute sets can be directly linked on an one-to-one basis to the entity owning and responsible for actions of the address. All transactions performed via an address (wallet) are attributable to its owner and are associated with its owner's rights. Since the address owner's attributes (and derived rights) may be stored and assessed separate from the address owner's personal identifiable information (PII), the privacy of transaction participants may be protected while ensuring that the transaction is attributable and compliant.

In step 2, when a wallet 20 associated with an address makes a request to engage in a transaction (payment, transfer, purchase, trade, etc) involving one or more tokens (which can represent other tokenized assets of value), PEP 10 is consulted. The PEP may exist on ledger via smart contracts or ledger controls providing decentralized policy enforcement, or off ledger providing federated rights assessments through SAML (Security Assessment Markup Language) assertions or other syntax.

To enforce a policy, in step 3, PEP 10 queries rules engine 12 which, as described below, is designed to provide a scalable and deterministic way to interpret policy and gather data from a wide range of services to provide timely decision-making for a given transaction context (including user identities, locations, token attributes and other variables). For example, a token may represent share ownership of a US Regulation D security. As a result, it's distribution is limited to individuals who have established that they are accredited investors. A Recipe limiting distribution to wallets whose owner has been assessed to be an accredited investor may be attached to the token. In this case the PEP must obtain the attribute (whether or not the participant is accredited) for all participants in the transaction, and evaluate it against the policy for token transfers. In step 4, rules engine 12 gathers the appropriate policy associated with the desired right specified in the transaction request. Policies are stored as "recipes", i.e. rulesets that represent compliance requirements and other desired governance. Recipes may be combined, reused or extended to leverage precedent, map complex and varied global regulations, and simplify regulatory oversight. Rules engine 12 may cache recipes to facilitate rapid decisions for frequently used objects. The logic and function of rules engine may be implemented on ledger, off ledger, or as a hybrid solution for maximum flexibility, decentralization, and scale.

In step 5, attribute sources 16 are consulted to gather relevant data on transaction participants, objects, and environment. Rules engine 12 provides attributes which contain descriptions where and how to obtain data needed for policy decisions in accordance with relevant recipe. For example, if a rule limits the number of token holders, the attribute in the rule contains a map with instructions on how to obtain the current number of token holders so that the rule can be evaluated. The instructions can include a network address where the data is stored, an API to access the data, and authorization information to access the data. To ensure flexibility, rules engine 12 provides an interoperability framework and interfaces to enable consultation with external, independent data sources sometimes referred to as "oracles". Through this framework, data sources for rules assessment can be mapped to the policy. In step 6, policy decisions are returned from rules engine 12 to the PEP for enforcement. Rights to perform certain transactions are often cached at PEP 10 to facilitate efficient enforcement of recurring transactions. At step 7, the right, which can include a verb/object pair, to perform the desired action on the object is granted, based on the appropriate recipe(s) and identities, and attributes, and the requested transaction is executed.

Figure 2:
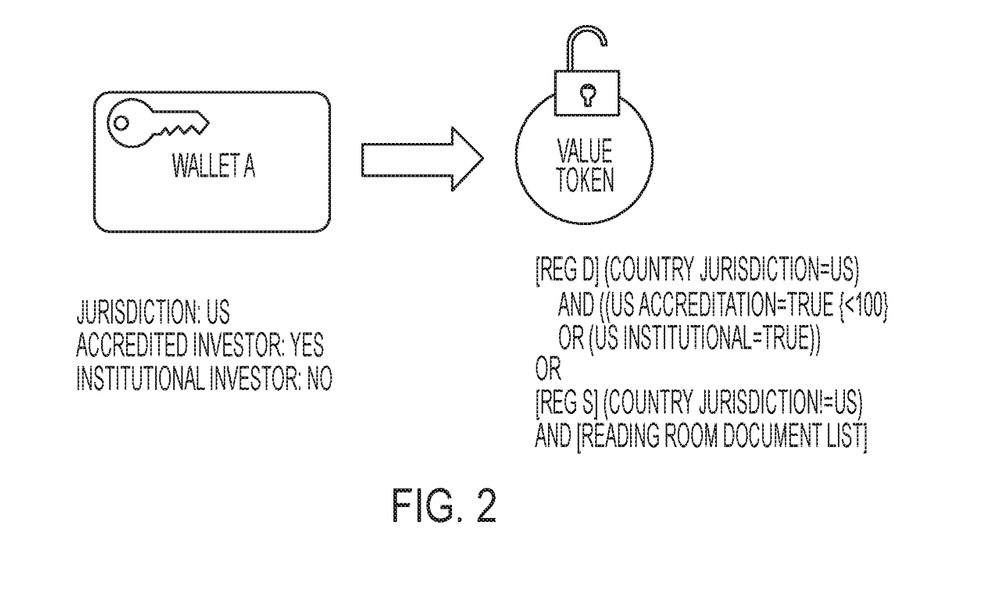
FIG. 2 is a schematic illustration of user/wallet attributes and token attributes for use in policy enforcement for token governance.

As shown in FIG. 2, the token is signed by the user's wallet, using the address as a cryptographic key to derive a signature in a known manner, and the signature includes wallet attributes that indicate the relevant jurisdiction for the user and investor status of the user (e.g. accredited investor, institutional investor, etc.). Additionally, the token includes token attributes, i.e. associated metadata indicating other contextual attributes of the transaction. Governance of the transaction based on the token attributes and participant attributed is described in greater detail below.

Figure 3:
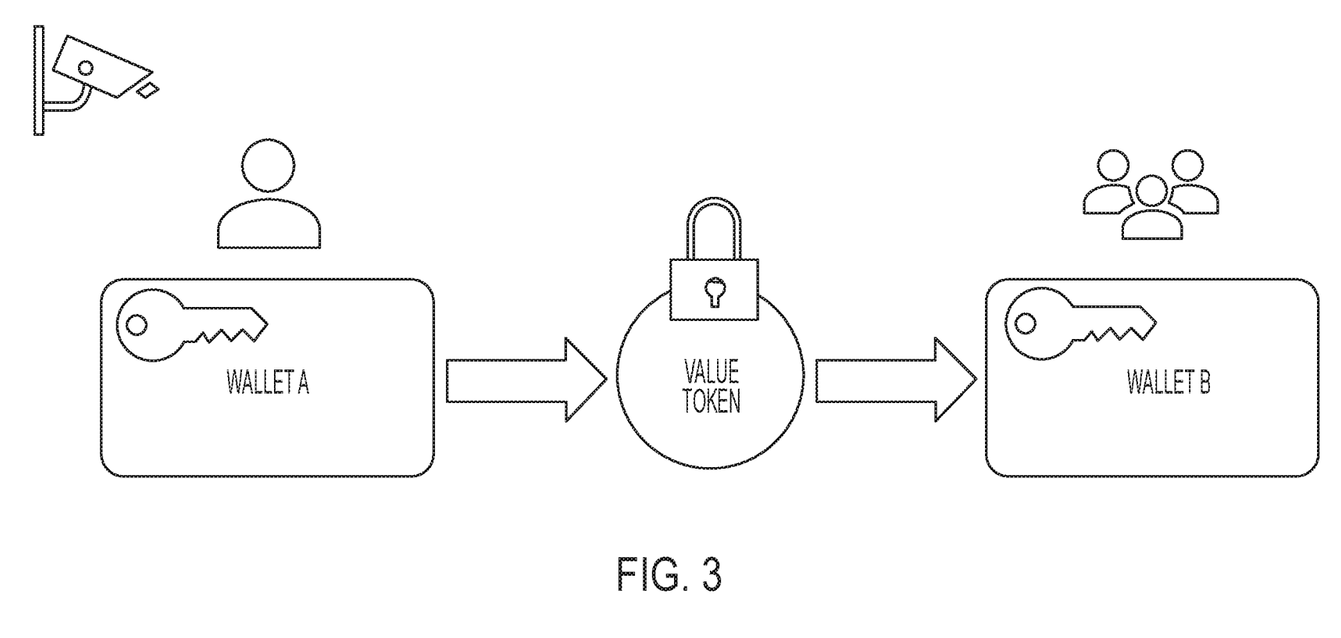
FIG. 3 is a schematic illustration of a key/lock structure to govern transactions between wallets according to an implementation.

As illustrated in FIG. 3, implementations use a key/lock structure that isolates issuer judgment via the mapping of wallet attributes to repeatable and verifiable rule sets associated with the underlying value in a transaction (Lock). Verified attributes of the owner of wallet A, or wallet B, and environment variables such as the size of a transaction or the number of current participants are composed into a Key which are evaluated against the rulesets defined for the token or other object (Lock) to determine if participants in a transaction have the right to conduct the transaction. These rights are evaluated in real time in a decentralized fashion using a smart contract or other ledger controls to permit or block the transaction.

Figure 4:
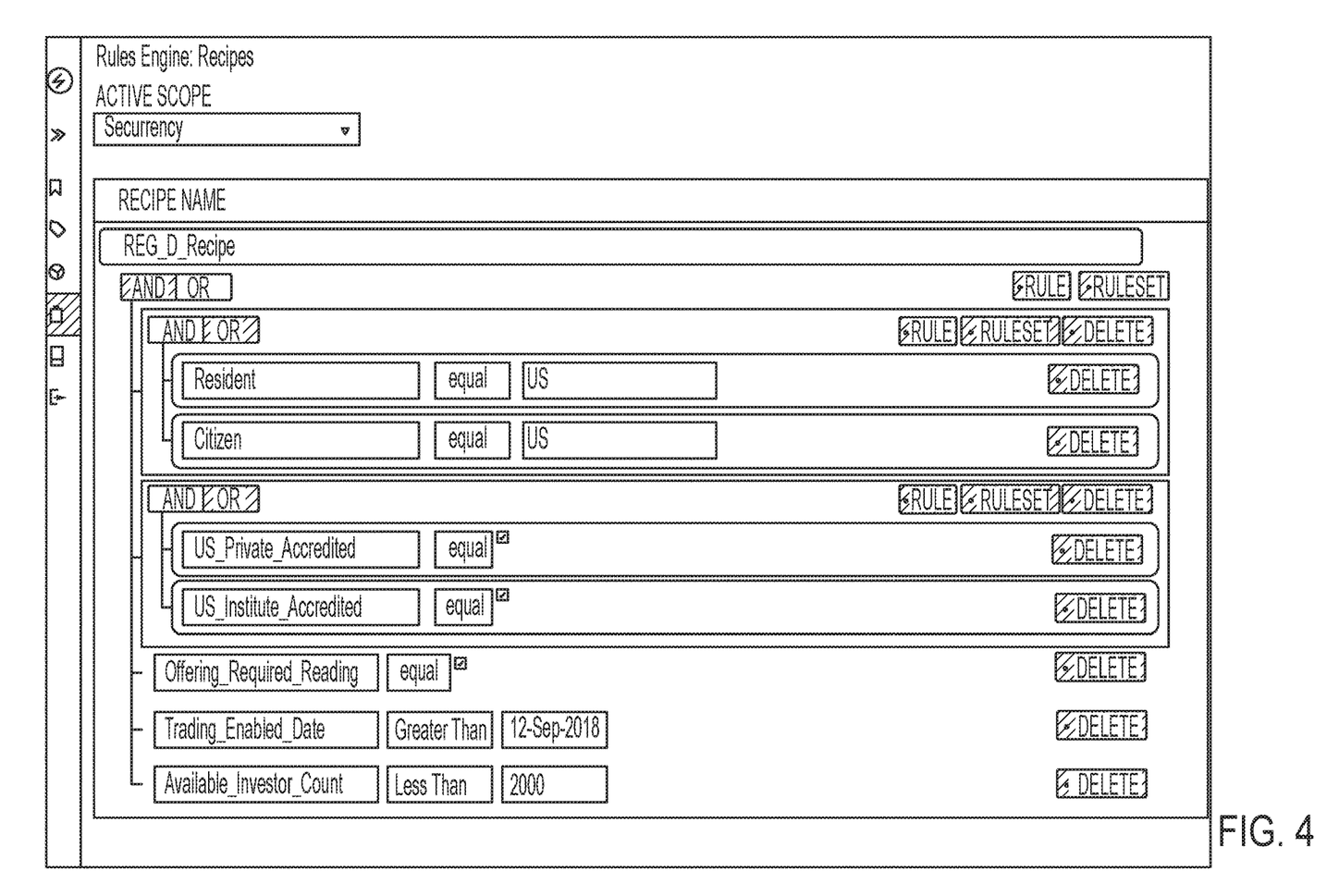
FIG. 4 is a screenshot of a regulatory recipe creation user interface according to an implementation.

The implementations provide a flexible, repeatable, and scalable process to codify compliance rules associated with any financial transaction through a Subject Verb Object (SVO) structure where the actor or actors attempting an action are the subject, the action being attempted is the verb, and the item on which the action is to be performed is the object. For example, a user (subject) is attempting to transfer (verb) a specific token (object). Extending ABAC approaches in this way, i.e., by converting access decisions to rights decisions permits a more flexible framework for governing complex transactions on financial networks. FIG. 4 shows user interface 400 for creating and editing recipes. User selection controls are provided for selecting attributes, values and logic for rules in a recipe.

The right to perform an action on an object, such as the transfer of a token, is evaluated by taking attributes associated with the subject (e.g. one or more transaction participants) and its context against a ruleset (recipe) that is assigned to the specific verb and object combination. In this way, the issuer can govern, for example, whether or not a user who does not have an attribute indicating accredited investor status can participate in a transaction involving a restricted access security token. The transaction participants and environmental context (subject) provide the "key" while the desired action and token (verb/object) combination are associated with the "lock" to govern transactions.

Codifying complex decision logic associated with financial services rights evaluation requires that rules engine 12 be configured to implement a number of objects and concepts: scopes, items, actions, attributes, rules, recipes, and rights. "Scopes" are shared context, in which multiple parties can define items, actions, and rights. Access to read and modify these definitions requires credentials assigned to the scope providing the means to share while protecting the responsibility and accountability of rights management. Tokens are the objects against which rights are assessed. Within a scope, systems are free to create and maintain as many items (in the case of securities tokens these are the usually unique token symbols) as desired. "Actions" are the verbs that can be performed on the items in the system (e.g. trade, transfer, etc). "Attributes" are characteristic of the actors and their environment used in the evaluation of a ruleset.

Within a scope, attributes contain the name and mechanism to obtain data associated with the actor, item, and environment for real time evaluation of the rule set. For example, a ruleset may include the requirement for participants in a transaction to be an accredited investor. The attribute contains the description of where to obtain this data in the context of the requested transaction and recovers it for rule evaluation. A rule contains an attribute, a comparison operator, and a desired value. For example, a rule could assess a user's country of residence. The following rule requires that the participant in the transaction cannot be a resident of the US: Jurisdiction_Country (Attribute) IS NOT (Comparison Operator) United States (Desired Value).

Rules may be composed and connected by rule operators (AND, OR, and fuzzy logic operators) using the GUI of FIG. 4 for example, into rulesets which can be stored as Recipes. Recipes are attached to object/verb combinations to define the attributes required to obtain rights to conduct a transaction on the network.

Rules engine 12 may be located on chain or off chain to support scalable and/or decentralized rule evaluation. The implementations include several models for implementation of rules engine 12, including rules evaluation off chain to facilitate scale and flexibility, on chain for maximum decentralization, or a hybrid model for maximum flexibility, decentralization, and compatibility with DLTs and legacy financial networks. One example of a hybrid model hosts the rules engine located off chain but evaluates rights stored on chain for rapid execution.

Figure 5:
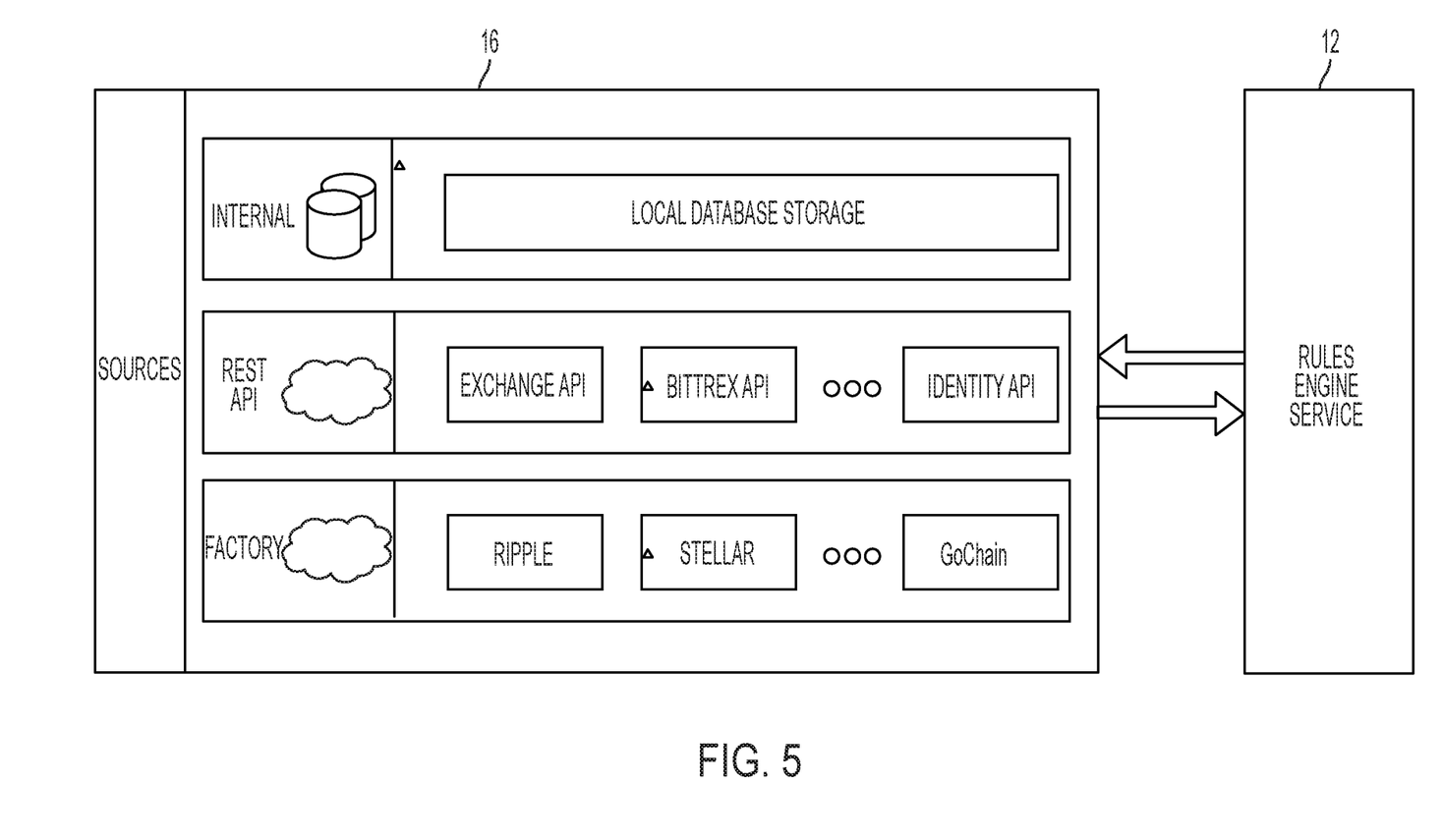
FIG. 5 is a diagram illustrating an implementation of the flow of data from attribute sources to the rules engine to facilitate policy decisions.

As shown in more detail in FIG. 5, rules engine 12 gathers the required data, as defined by the appropriate attributes contained the recipe associated with the action context and participants, from sources 16. Gathered data can include strings, numerical data, dates, lists, and other formatted data to be used for evaluation. Sources 16 can be cache memory and/or internal/external sources.

Rules can be composed from attributes which contain self-describing models for data collection and caching in support of rule evaluation. An attribute can describe its data type and format, source, the means to access the source, additional filtering and context data, and caching rules to manage the balance between performance and latency for specific attributes. Attribute sources 16 can communicate with rules engine 12 through an appropriate. For example, if a recipe contains a rule that limits the number of token holders, the Rules Engine must obtain the current number of token holders in order to evaluate the legitimacy of the requested transaction. The current number of token holders is obtained by querying the distributed ledger on which the token resides. The attribute contains instructions used by the Rules Engine to point to the code used to query the ledger. Recipes may consist of many rules containing attributes requiring data from many different sources. New recipes may be developed requiring additional data not previously mapped. Therefore, attribute mapping is performed through a flexible architecture that allows new sources to be injected into the engine efficiently and without affecting any other system operation.

Rules engine 12 evaluates the recipe associated with the desired object/verb combination to determine if the right to perform the action can be granted. A user's rights in a particular context can be: utilized inline to govern a transaction in real time; may be stored on or off chain; or shared via RESTful API calls, SAML assertions, or OpenID Connect data format.

If Rights are stored or cached at PEP(s) 10, they can have an expiration to accommodate for dynamics such as regulatory changes. Stored rights may be invalidated due to changes in recipe rules or context. The system may force a revalidation of rights in the event of a change. Rights may be cached on chain via smart contracts (Ethereum, EOS, etc) or ledger controls (Ripple, Stellar).

Non-limiting examples of policy enforcement processes are described below for the governance of financial transactions: 1) distribution control through the use of ledger controls (for example implemented on Ripple, Stellar, etc.); 2) distribution control through the use of smart contracts (for example, implemented on Ethereum, EOS, and derivatives); 3) distribution control through the use of an interoperability and a decorator pattern (cross ledger enforcement); and 4) distribution control through the use of shared rights and permissions (for example, implemented on centralized exchanges and 3rd party systems).

Policy enforcement through ledger controls utilizes transaction callback methods and "trustlines." Trustlines are two-way agreements between the wallet owner and token issuer (or other designated party) stored on ledger to govern the right of a wallet to participate in transactions with a token. Through callbacks, or web hooks, the ledger platform may consult with external services, such as rules engine 12, to provide more fine-grained control over specific transactions on the network.

Figure 6:
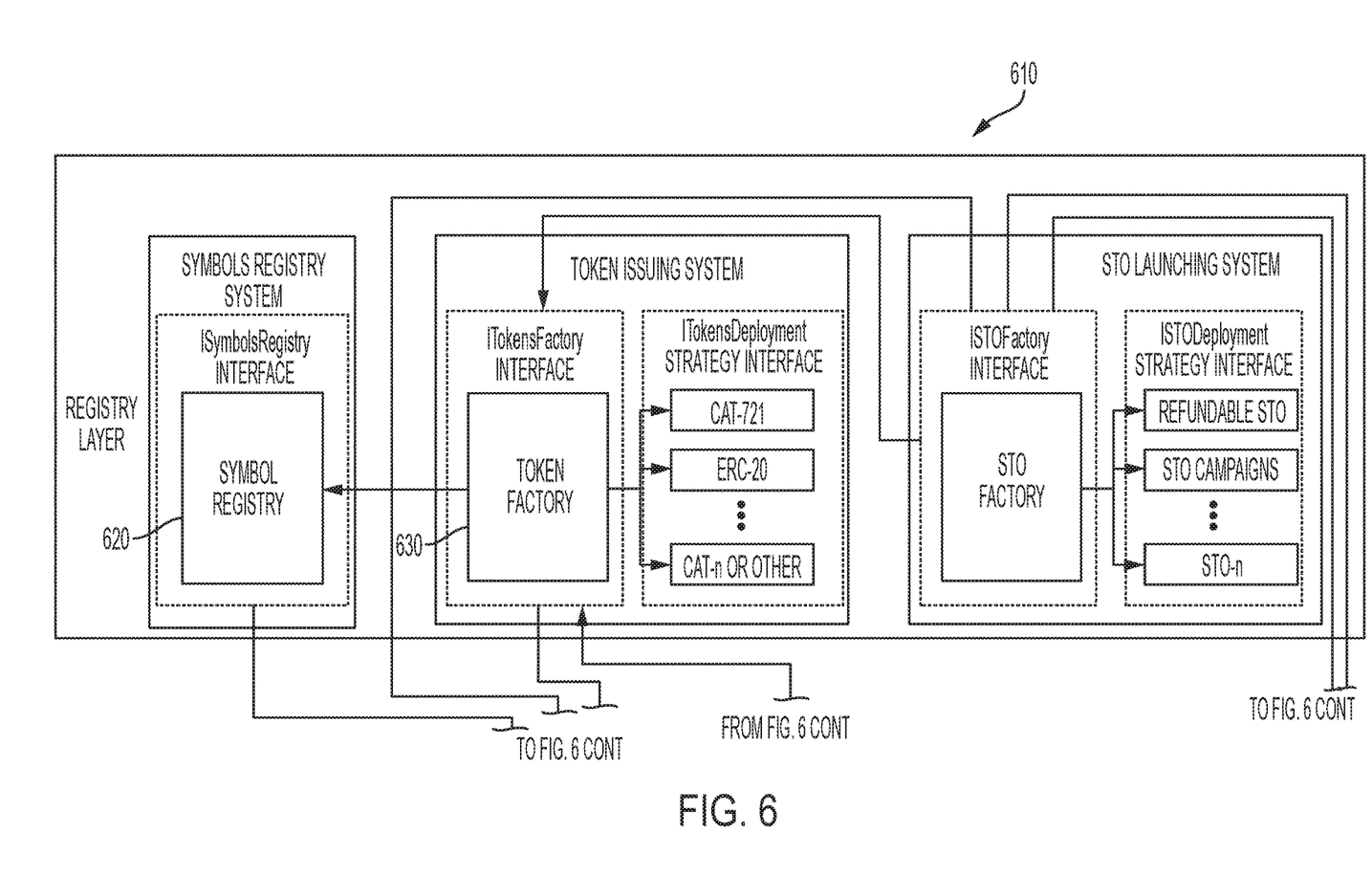
FIG. 6 is a block diagram of an architecture for token creation, distribution control, policy enforcement, and rights enforcement in accordance with an implementation.

FIG. 6 illustrates an architecture of PEP 610 for DLTs implementing smart contracts, that is, decentralized applications (dApps) that run via distributed nodes. Blockchain enhanced PEP 610 supports the most popular Ethereum token standards (ERC20, ERC621, ERC721, etc.) and can be extended to support any token protocol on any blockchain. Through a smart contract executed by PEP 610, token issuers may instantly issue tokens with compliance controls built in as well as tokens that do not contain distribution controls. The smart contract can provide enhancements enabling issuers to register symbol uniqueness on the network by means of symbol registry and to govern distribution of the tokens through additional security and rules enforcement including compliance rollback transactions, value escrow, and freezing of wallets.

The architecture of PEP 610 includes the following components to facilitate distribution control. Symbol registry 620 is a repository for token symbols. Issuers may register token symbols prior to token creation to protect trademark and brand rights prior to token deployment. Token factory 630 is a component which accepts requests to create new tokens, checks the relevant parameters and deploys a token through a token strategy, e.g., the supported behavior of tokens governed by a standard. Token factory 630 performs the functions of creating tokens as well as deleting or updating deployment strategies. A strategy is the smart contract, that is, computer code, that implements a token and that defines its behavior and interfaces. Typically, a strategy is linked to a token standard. When executed, it results in the delivery of a token that provides common interfaces required by the standard. For example, the Token factory supports issuance of ERC-20, ERC-721, and many other standards. While changes to strategies are infrequent, these smart contracts may be updated or removed over time. It is anticipated that many new strategies will emerge and will be added providing issuers a greater range of options in the behavior of their tokens.

Permission verification system (PVS) 640 serves as a core for verification of the requests which are processed in deployed smart contracts. It embodies capabilities to evaluate recipes, cache rights, store wallet attributes, and reach external data sources to retrieve other attributes by following pointers to data sources storing the attributes.

Transfer verification system (TVS) 650 assigns policy and enforcement logic based on the token's assigned strategy, that is the behaviors defined for the token based on the selection of smart contract assigned by the Token Factory. Each standard can implement specific transfer verification logic and can contain one or more enforcement services, such as whitelist, rules engine, and the like). TVS 650 includes transfer module 652 which accepts requests on the tokens transfer verification. Transfer module 652 requests a token standard from token factory 630. Based on the applicable token standard, transfer module 652 can select transfer verification logic.

Transfer verification system 650 also includes transfer verification policy enforcement) through transfer verification logic 654 specified for each token standard, such as CAT-20, CAT-721, etc. CAT-20 stands for Compliance Aware Token, and extends the ERC-20 standard implementation to include distribution controls. Transfer verification logic 654 can be implemented by means of different transfer verification services 656, such as a whitelist, rules engine (such as rules engine 12 in FIG. 1), state logic, or other services. There could be different transfer verification services 656 for each token standard. Transfer verification service 656 stores verified rights and attributes associated with tokens, wallets, and gathers data from on chain and off chain transactions. One example of a rights store is a whitelist which stores a list of wallets that have been verified for specific transactions involving tokens. The whitelist can be used to verify the eligibility of all wallets involved in a transaction prior to sending or receiving requests. In such an implementation, if a wallet is not found in the whitelist the transaction is rejected. Transaction policies for a token may be stored as recipes on chain. Similarly, attributes associated with a wallet's owner may be stored on chain as well. This permits decentralized rules evaluation.

Figure 7:
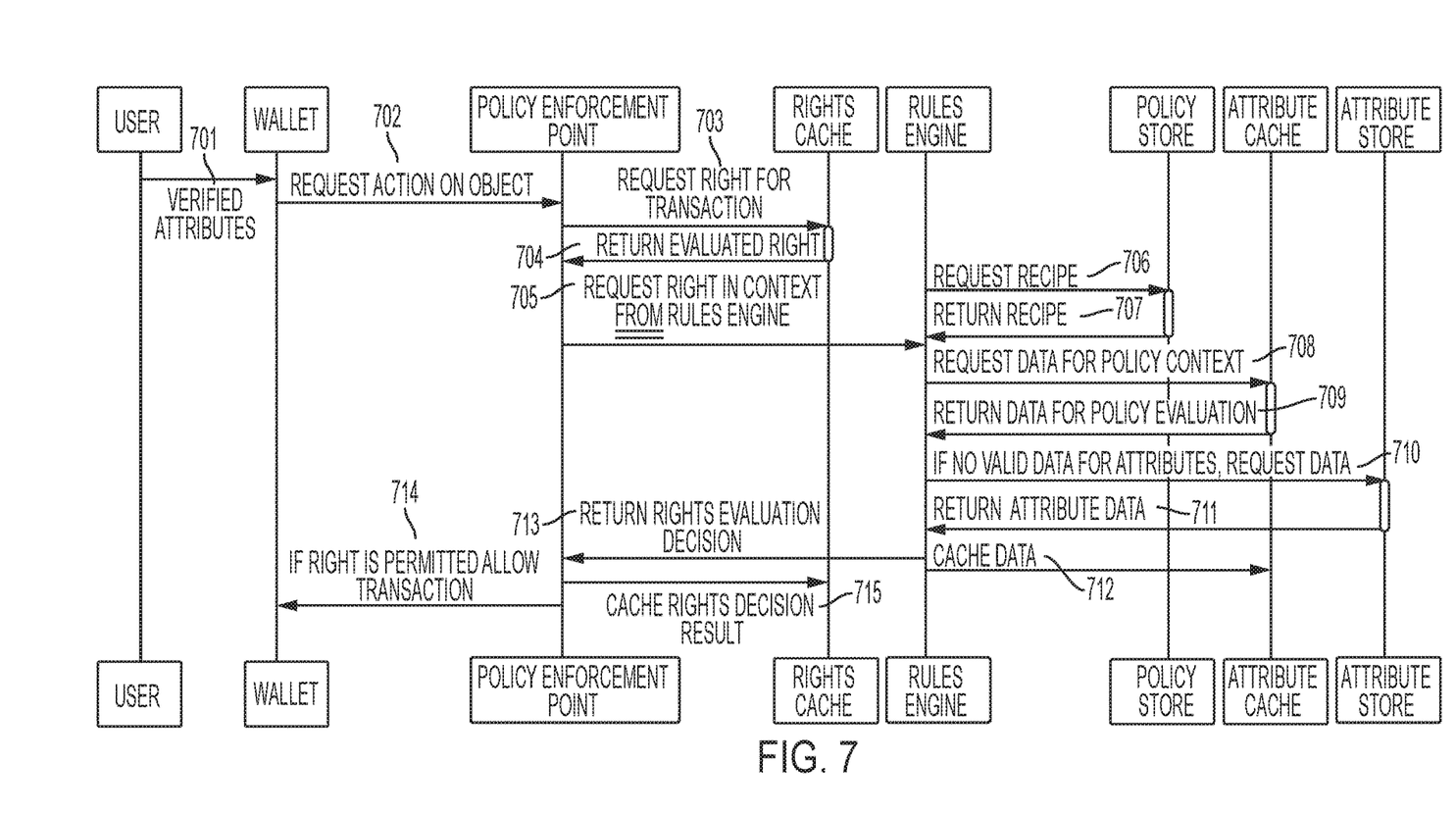
FIG. 7 illustrates the data flow of an implementation of a process for governing transactions.

FIG. 7 illustrates an implementation of a process for rights determination and governance of a transaction. At 701, a user device confers verified attributes on a wallet, for example, the attribute verification processes described above can be used to determine user attributes, such as the residence country of the user and whether the user is an accredited and/or institutional investor. For this example, the user country of jurisdiction is US and the user is an accredited investor. See FIG. 2. At 702, the user wallet makes a request to a PEP, on behalf of the user, for an action on an object. For example, the wallet may make request to transfer a token from the wallet owner to another party. In this example the token is the token of FIG. 2 which represents a security being offered under Regulation D of Title 17: Commodity and Securities Exchanges PART 230—GENERAL RULES AND REGULATIONS, SECURITIES ACT OF 1933. Therefore, the token has a recipe that requires the following attributes Jurisdiction:US, AND Accreditation=True. Of course, the "wallet" making the request can be any user device, such as a personal computer or a mobile phone, having access to the wallet address and the user instructions can be received through a user interface of the user device. The all participants in the transaction have the required attributes noted above (Jurisdiction:US, Accreditation:True). At 703, the PEP requests rights for the token and participants involved in the transaction from a rights cache. For example, the rights cache can include previously evaluated rights for desired token and the participants involved in the transaction. At 704, if the evaluated rights for requested transaction are available in the cache, the evaluated rights for the request can be returned to the PEP directly from the cache. and the process can proceed to step 713 below.

If the rights had not been previously evaluated for the specific attributes, i.e. the context, and thus not returned to PEP at 704, new rights must be evaluated for the context. To create new rights, at 705 PEP makes a request for rights in the transaction context from the rules engine. At 706, the rules engine makes a request for a recipe corresponding to the requested rights for the context and the recipe is returned at 707. At 708, rules engine requests additional data for the relevant context from an attribute cache. If the relevant data is in the attribute cache, the data is returned for policy evaluation at 709. The relevant data could include credit ratings, jurisdictional data, investors qualifications, collateral information, trade match information, account balances, reporting documents filed, and the like that are required for the transaction suitability evaluation. If the relevant data as not been cached, rules engine requests the data from another source, such as an attribute store at 710 and the attributes are returned at 711. The data can then be stored in attribute cache for later use at 712. At 713, rights are returned to PEP for an evaluation decision based on the recipe, user attributes, token attributes and relevant external data. For example, since the token represents a security to be sold under Reg D, the recipe, in simplified example, could be as expressed below:
  (1) participants must be US persons,
  (2) participants must be accredited individual or institutional investors,
  (3) participants must have read risk disclosures associated with the offering.

Of course, the actual requirements of Reg D and any other requirements are much more complicated than the example above. If the returned rights are determined by PEP to be permitted, the wallet is permitted to conduct the requested transaction at 714. The evaluated rights can be cached in rights cache for later use at 715

Figure 8:
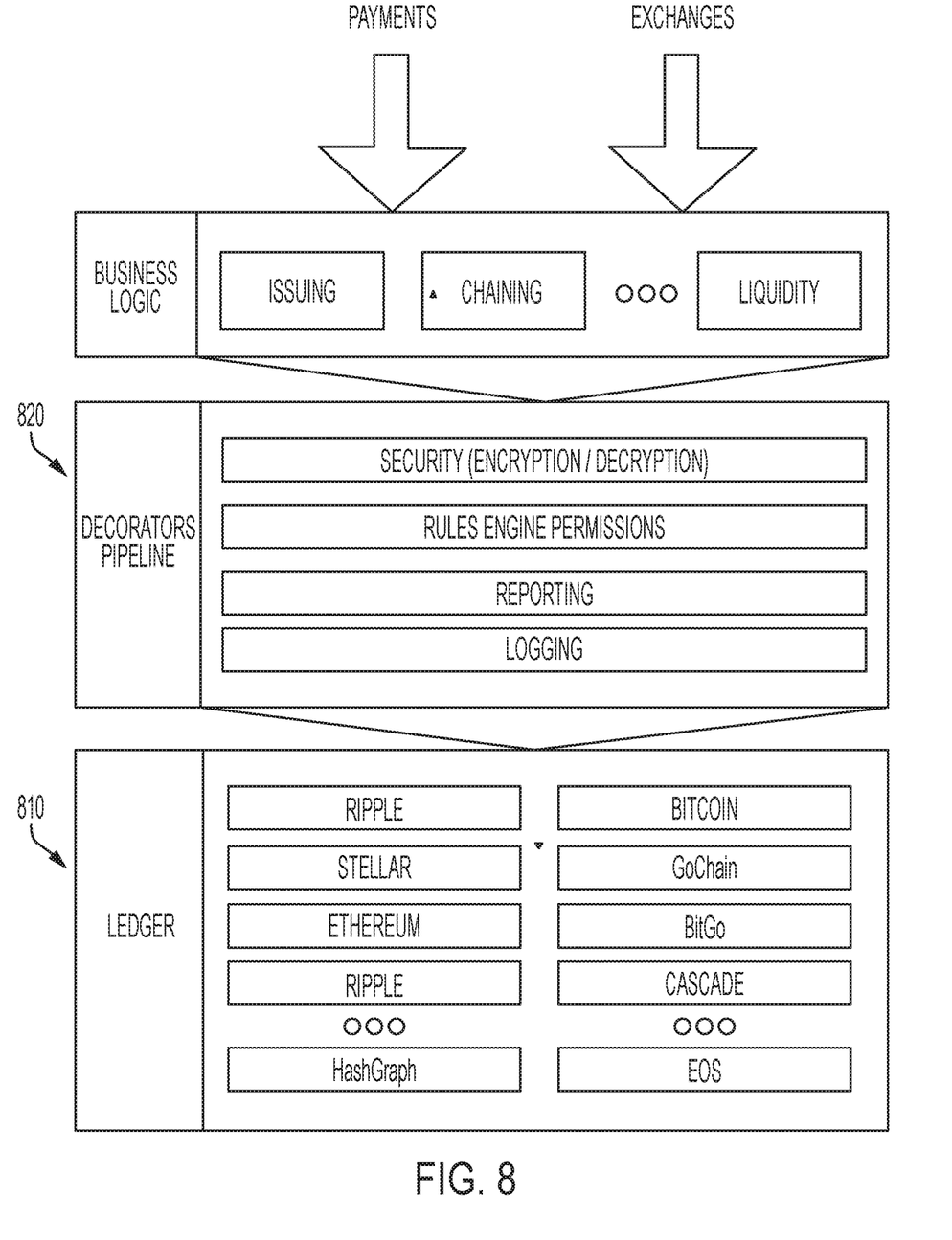
FIG. 8 illustrates an implementation of an interoperability layer and decorator pattern that provides cross ledger policy enforcement.

FIG. 8 is diagram of the interoperability layer and decorator pattern in one example. Implementations can use a policy enforcement mechanism that supports transaction governance on chain and off chain. This permits consistent rules enforcement across dissimilar ledgers 810 including traditional financial service infrastructures by using an interoperability layer and a decorator pattern. A decorator pattern is one in which similar actions across dissimilar networks can be intercepted to execute common security and compliance functions. In certain implementations, this abstraction layer can be extended or overridden governance of specific transactions that may also have intrinsic controls.

In the decorator pattern, transactions are routed through pipeline 820, a federated service bus that provides policy enforcement, security functions, and automated logging, reporting and oversight. The decorator pattern is part of an abstraction layer that routes transactions to appropriate financial systems, exchanges, and ledger technologies to execute the transaction. This implementation provides common policy enforcement across dissimilar financial systems.

In another implementation, rights are obtained by $3^{rd}$ party systems, such as an exchange platform, for internal policy enforcement. Rights may be obtained at the time of a user's login via a direct request to the rules engine 12 (FIG. 1) or indirectly through SAML assertions provided by an identity and attributes service. The $3^{rd}$ party system may obtain a comprehensive set of rights (verb/object combinations) associated with the user in the given context and scope. These rights can be used to govern transactions on the exchange using the native permission framework used by the $3^{rd}$ party system.

In all implementations, the user's right to engage in a transaction (such as the trade or transfer of a token) can be assessed in advance of the transaction and stored in a cache or at the time of the transaction for real time governance. The users right to perform an action on a token is determined through a request to the appropriate policy enforcement point. If granted, the user's right may be stored on or off ledger in a cache with an expiration as appropriate.

The various functions disclosed herein can be accomplished by one or more computing devices having processors which execute instructions stored in one or more tangible computer readable memories. The various devices can be communicatively coupled to one another in known manners using known protocols. For example, the devices can be coupled over a Local Area Network or the Internet and affect ledgers that may reside on centralized, private decentralized, or public decentralized networks.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method executed by at least one computing device for governing object transactions on a distributed ledger over a computer network whereby reusable policy can be enforced on a per transaction basis in substantially real time without consulting a centralized approval authority, the distributed ledger being a cryptographically secured ledger that includes shared nodes respectively executed by multiple parties and uses a consensus mechanism between the parties to authorize transactions to be entered on the ledger, the method comprising:
  storing plural transaction policies independently from policy evaluation algorithm code and transaction execution logic to thereby enable reuse of the transaction policies and simplify third party validation of the transaction policies, wherein each transaction policy includes configurable machine readable code specifying at least one rule to be enforced, wherein the at least one rule specifies a verb/object pair, the storing including storing the transaction execution logic on a centralized system and storing the at least one rule on the distributed ledger, the at least one rule including a comparison operator, an attribute and a desired value for comparison to a transaction, wherein the attribute includes a pointer to attribute data stored in at least one data source, wherein the pointer is stored in the data structure of at least one of the transaction policies and the pointer includes data caching instructions thereby enabling the inclusion of data from configurable dynamic data sources wherein the attribute data can be applied at the time of policy evaluation and wherein the transaction policies are stored on non-transient media as computer interpretable code specifying a specific compliance requirement for a transaction;
  receiving a request message, to engage in an action with respect to at least one object that is specified by the request message, the request message being received from a decentralized node corresponding to a requesting participant on the distributed ledger, wherein the at least one object is configured as a Subject Verb Object (SVO) data structure specifying an actor that requests participation in a subject field, a requested action in a verb field, and an item on which the requested action is to be performed in an object field, the at least one object having object attribute values associated therewith, the request message including a requested action, an object affected by the action, and other parameters associated with the transaction;
- engaging, by a policy enforcement point, in a transaction authorization process that is distinct from the transaction execution logic interpreting at least one applicable transaction policy of the plural transaction policies for the requested action including evaluation of rules and data in substantially real-time by applying the policy evaluation algorithm code, the transaction authorization process including:
  - identifying a relevant transaction policy, from amongst the plural transaction policies, based on the requested action and the object specified by the request message, including parsing the object and reading the verb field,
  - collecting relevant attribute data from the at least one data source in substantially real-time including parsing the attribute of the relevant transaction policy and following the pointer specified by the attribute to the data source, wherein the attribute data is relevant to at least one of the action, the object, and/or participants and wherein the at least one data source shares the attribute data in accordance with a pre-defined scope that defines sharing rights of the attribute data;
  - executing, by a decentralized rules engine, the action evaluation algorithm including executing machine-readable action evaluation code the action evaluation algorithm being configured to interpret and evaluate the relevant transaction policy and the requested action to thereby determine if the action can be authorized in response to the request message by applying the at least one rule in the identified policy and the attribute data in substantially real time with respect to the request; and
  - receiving, by the policy enforcement point, an authorization determination indicating whether the action can be authorized in accordance with the request message; and
- granting a right to perform the requested action and returning transaction process control to the transaction execution logic when the authorization determination is positive to thereby facilitate completion of the action and cancelling the transaction processing when the authorization determination is negative.

2. The method of claim 1, wherein the other parameters associated with the transaction include at least one of a transaction amount, price, transaction destination, other assets and/or participants.

3. The method of claim 1, wherein the rules are configured to be can be combined using at least one of Boolean logic, fuzzy logic, and/or parameter weighting.

4. The method of claim 1, wherein the attribute data includes data indicating at least one of participant regulatory qualifications, participant residence, participant citizenship, asset regulatory framework, allowed transaction characteristics, and/or jurisdiction.

5. The method of claim 1, wherein the granting rights includes retrieving, from a cache, rights which have been evaluated based on the policy, the attribute data, and the object.

6. The method of claim 1, wherein the policy is a codification of at least one of issuer policies, international securities laws and regulations, and/or other transaction controls into pseudo code.

7. The method of claim 1, wherein a verified identity of each participant is mapped to a wallet address to and wherein the request message includes the wallet address mapped to the requesting participant.

8. The method of claim 1, further comprising communicating through an interoperability layer and decorator pattern to govern financial transactions across multiple dissimilar traditional or distributed ledgers.

9. The method of claim 1, wherein the rules engine is executed on the distributed ledger.

10. The method of claim 1, wherein the rules engine is executed both on the distributed ledger and off-chain.

11. The method of claim 1, wherein the rules engine is executed off-chain.

12. A system for governing object transactions on a distributed ledger over a computer network whereby reusable policy can be enforced on a per transaction basis in substantially real time without consulting a centralized approval authority, the distributed ledger being a cryptographically secured ledger that includes shared nodes respectively executed by multiple parties and uses a consensus mechanism between the parties to authorize transactions to be entered on the ledger, the system comprising:
- at least one computer processor; and
- at least one memory having instructions stored therein which, when executed by the at least one computer processor, cause the at least one computer processor to:
- store plural transaction policies independently from policy evaluation algorithm code and transaction execution logic to thereby enable reuse of the transaction policies and simplify third party validation of the transaction policies, wherein each transaction policy includes configurable machine readable code specifying at least one rule to be enforced, wherein the at least one rule specifies a verb/object pair, the storing including storing the transaction execution logic on a centralized system and storing the at least one rule on the distributed ledger, the at least one rule including a comparison operator, an attribute and a desired value for comparison to a transaction, wherein the attribute includes a pointer to attribute data stored in at least one data source, wherein the pointer is stored in the data structure of at least one of the transaction policies and the pointer includes data caching instructions thereby enabling the inclusion of data from configurable dynamic data sources wherein the attribute data can be applied at the time of policy evaluation and wherein the policies are stored on non-transient media as computer interpretable code specifying a specific compliance requirement for a transaction;
- receive a request message, to engage in an action with respect to at least one object that is specified by the request message, the request message being received from a decentralized node corresponding to a requesting participant on the distributed ledger, wherein the at least one object is configured as a Subject Verb Object (SVO) data structure specifying an actor that requests participation in a subject field, a requested action in a verb field, and an item on which the requested action is to be performed in an object field, the at least one object having object attribute values associated therewith, the request message including a requested action, an object affected by the action, and other parameters associated with the transaction;
- engage, by a policy enforcement point, in a transaction authorization process that is distinct from the transaction execution logic by identifying and interpreting at least one applicable transaction policy of the plural transaction policies for the requested action including evaluation of rules and data in substantially real-time by applying policy evaluation algorithm code, the transaction authorization process including:
identifying a relevant transaction policy, from amongst the plural transaction policies, based on the requested action and the object specified by the request message, including parsing the object and reading the verb field;
collecting the relevant attribute data from the at least one data source in substantially real-time including parsing the attribute of the relevant transaction policy and following the pointer specified by the attribute to the data source, wherein the pointer is stored in the data structure of at least one of the policies and the pointer includes data caching instructions thereby enabling the inclusion of data from configurable dynamic internal or external sources, wherein the attribute data is relevant to at least one of the action, the object, and/or participants and wherein the at least one data source shares the attribute data in accordance with a predefined scope that defines sharing rights of the attribute data;
wherein the transaction policies are stored as reusable data structures on non-transient media as computer interpretable code specifying a specific compliance requirement for a transaction and wherein the at least one data source shares the attribute data in accordance with a predefined scope that defines sharing rights of the attribute data;
executing, by a decentralized rules engine, an action evaluation algorithm including executing machine-readable action evaluation code, the action evaluation algorithm being configured to interpret and evaluate the relevant transaction policy and the requested action to thereby determine if the action can be authorized in response to the request message by applying the at least one rule in the identified policy and the attribute data in substantially real time with respect to the request; and
receiving, by the policy enforcement point, an authorization determination indicating whether the action can be authorized in accordance with the request message; and
grant a right to perform the requested action and returning transaction process control to distinct transaction execution logic when the authorization determination is positive to thereby facilitate completion of the action and cancelling the transaction processing when the authorization determination is negative.

13. The system of claim 12, wherein the other parameters associated with the transaction include at least one of a transaction amount, price, transaction destination, other assets and/or participants.

14. The system of claim 12, wherein the rules are configured to be can be combined using at least one of Boolean logic, fuzzy logic, and/or parameter weighting.

15. The system of claim 12, wherein the attribute data includes data indicating at least one of participant regulatory qualifications, participant residence, participant citizenship, asset regulatory framework, allowed transaction characteristics, and/or jurisdiction.

16. The system of claim 12, wherein the granting rights includes retrieving, from a cache, rights which have been evaluated based on the policy, the attribute data, and the object.

17. The system of claim 12, wherein the policy is a codification of at least one of issuer policies, international securities laws and regulations, and/or other transaction controls into pseudo code.

18. The system of claim 12, wherein a verified identity of each participant is mapped to a wallet address to and wherein the request message includes the wallet address mapped to the requesting participant.

19. The system of claim 12, wherein communications occur through an interoperability layer and decorator pattern to govern financial transactions across multiple dissimilar traditional or distributed ledgers.

20. The system of claim 12, wherein the rules engine is executed on the distributed ledger.

21. The system of claim 12, wherein the rules engine is executed both on the distributed ledger and off-chain.

22. The system of claim 12, wherein the rules engine is executed off-chain.

23. Non-transient computer readable media storing instructions therein which, when executed by at least one computer processor, cause the at least one computer processor to accomplish steps of governing tokenized transactions on a distributed ledger over a computer network, whereby reusable policy can be enforced on a per transaction basis in substantially real time without consulting a centralized approval authority, the distributed ledger being a cryptographically secured ledger that includes shared nodes respectively executed by multiple parties and uses a consensus mechanism between the parties to authorize transactions to be entered on the ledger, the steps comprising:
storing plural transaction policies independently from policy evaluation algorithm code and transaction execution logic to thereby enable reuse of the transaction policies and simplify third party validation of the transaction policies, wherein each transaction policy includes configurable machine readable code specifying at least one rule to be enforced, wherein the at least one rule specifies a verb/object pair, the storing including storing the transaction execution logic on a centralized system and storing the at least one rule on the distributed ledger, the at least one rule including a comparison operator, an attribute and a desired value for comparison to a transaction, wherein the attribute includes a pointer to attribute data stored in at least one data source, wherein the pointer is stored in the data structure of at least one of the policies and the pointer includes data caching instructions thereby enabling the inclusion of data from configurable dynamic data sources wherein the attribute data can be applied at the time of policy evaluation and wherein the policies are stored on non-transient media as computer interpretable code specifying a specific compliance requirement for a transaction;
receiving a request message, to engage in an action with respect to at least one object that is specified by the request message, the request message being received from a decentralized node corresponding to a requesting participant on the distributed ledger, wherein the at least one object is configured as a Subject Verb Object (SVO) data structure specifying an actor that requests participation in a subject field, a requested action in a verb field, and an item on which the requested action is to be performed in an object field, the at least one object having object attribute values associated therewith, the request message including a requested action, an object affected by the action, and other parameters associated with the transaction;

engaging, by a policy enforcement point, in a transaction authorization process that is distinct from the transaction execution logic by identifying and interpreting at least one applicable transaction policy of the plural transaction policies for the requested action including evaluation of rules and data in substantially real-time by applying policy evaluation algorithm code, the transaction authorization process including:

identifying the at least one applicable transaction policy, from amongst plural transaction policies, based on the requested action and the object specified by the request message, including parsing the object and reading the verb field;

wherein the transaction policies are stored as reusable data structures on non-transient media as computer interpretable code specifying a specific compliance requirement for a transaction;

collecting relevant attribute data from the at least one data source in substantially real-time including parsing the attribute of the at least one applicable transaction policy and following the pointer specified by the attribute to the data source, wherein the pointer is stored in the data structure of at least one of the policies and the pointer includes data caching instructions thereby enabling the inclusion of data from configurable dynamic internal or external sources, wherein the attribute data is relevant to at least one of the action, the object, and/or participants and wherein the at least one data source shares the attribute data in accordance with a predefined scope that defines sharing rights of the attribute data;

executing, by a decentralized rules engine an action evaluation algorithm including executing the machine-readable action evaluation code, the action evaluation algorithm being configured to interpret and evaluate the at least one applicable transaction policy and the object and the requested action to thereby determine if the action can be authorized in response to the request message by applying the at least one rule in the identified policy and the attribute data in substantially real time with respect to the request; and receiving, by the policy enforcement point, an authorization determination indicating whether the action can be authorized in accordance with the request message; and granting a right to perform the requested action and returning transaction process control to distinct transaction execution logic when the authorization determination is positive to thereby facilitate completion of the action and cancelling the transaction processing when the authorization determination is negative.

24. The media of claim 23, wherein the other parameters associated with the transaction include at least one of a transaction amount, price, transaction destination, other assets and/or participants.

25. The media of claim 23, wherein the rules are configured to be can be combined using at least one of Boolean logic, fuzzy logic, and/or parameter weighting.

26. The media of claim 25, wherein communications occur through an interoperability layer and decorator pattern to govern financial transactions across multiple dissimilar traditional or distributed ledgers.

27. The media of claim 23, wherein the attribute data includes data indicating at least one of participant regulatory qualifications, participant residence, participant citizenship, asset regulatory framework, allowed transaction characteristics, and/or jurisdiction.

28. The media of claim 23, wherein the granting rights includes retrieving, from a cache, rights which have been evaluated based on the policy, the attribute data, and the object.

29. The media of claim 23, wherein the policy is a codification of at least one of issuer policies, international securities laws and regulations, and/or other transaction controls into pseudo code.

30. The media of claim 23, wherein a verified identity of each participant is mapped to a wallet address to and wherein the request message includes the wallet address mapped to the requesting participant.

31. The media of claim 23, wherein the rules engine is executed on the distributed ledger.

32. The media of claim 23, wherein the rules engine is executed both on the distributed ledger and off-chain.

33. The media of claim 23, wherein the rules engine is executed off-chain.

* * * * *